United States Patent
Krueger et al.

(10) Patent No.: US 10,166,985 B2
(45) Date of Patent: Jan. 1, 2019

(54) METHODS AND SYSTEMS FOR AUTONOMOUS VEHICLE PERFORMANCE CAPABILITY

(71) Applicant: GM GLOBAL TECHNOLOGY OPERATIONS LLC, Detroit, MI (US)

(72) Inventors: Eric E. Krueger, Chelsea, MI (US); Robert L. Nisonger, Milford, MI (US); Edward T. Heil, Howell, MI (US); Brandon C. Pennala, Howell, MI (US); Patrick J. Monsere, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/443,995

(22) Filed: Feb. 27, 2017

(65) Prior Publication Data

US 2018/0244271 A1    Aug. 30, 2018

(51) Int. Cl.
| | |
|---|---|
| *G01C 22/00* | (2006.01) |
| *G05D 1/00* | (2006.01) |
| *B60W 30/14* | (2006.01) |
| *G01L 1/00* | (2006.01) |
| *G01L 3/00* | (2006.01) |
| *G01L 5/00* | (2006.01) |

(52) U.S. Cl.
CPC ......... *B60W 30/146* (2013.01); *G05D 1/0088* (2013.01); *B60W 2520/12* (2013.01); *B60W 2530/20* (2013.01); *B60W 2720/10* (2013.01)

(58) Field of Classification Search
CPC ........... B60W 30/146; B60W 2520/12; B60W 2530/20; B60W 2720/10; B60W 30/188; B60W 40/068; B60W 30/02; G05D 1/0088
USPC .............................................. 701/24; 702/41
See application file for complete search history.

(56) References Cited

U.S. PATENT DOCUMENTS

| | | | |
|---|---|---|---|
| 2011/0130974 A1* | 6/2011 | Yngve | B60W 40/068 702/41 |
| 2017/0088128 A1* | 3/2017 | Nakada | B60W 30/02 |
| 2017/0158199 A1* | 6/2017 | Pallett | B60W 30/188 |

* cited by examiner

*Primary Examiner* — Mahmoud S Ismail
(74) *Attorney, Agent, or Firm* — Lorenz & Kopf, LLP (57) ABSTRACT

Systems and method are provided for controlling a vehicle. In one embodiment, a method includes: receiving, by a processor, at least one of state health and performance information associated with at least one vehicle actuator; processing, by the processor, the state of health and performance information to determine an acceleration value; and controlling the vehicle based on the acceleration value.

17 Claims, 6 Drawing Sheets

METHODS AND SYSTEMS FOR AUTONOMOUS VEHICLE PERFORMANCE CAPABILITY

TECHNICAL FIELD

The present disclosure generally relates to autonomous vehicles, and more particularly relates to systems and methods for determining a performance capability and controlling the autonomous vehicle based on the performance capability.

INTRODUCTION

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

In order for autonomous driving systems to plan the vehicle path and determine driving style, the system must comprehend the physical capability of the vehicle to follow provided instructions. Accordingly, it is desirable to provide systems and methods that determine vehicle performance capability and that control the vehicle based thereon. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle. In one embodiment, a method includes: receiving, by a processor, at least one of state health and performance information associated with at least one vehicle actuator; processing, by the processor, the state of health and performance information to determine an acceleration value; and controlling the vehicle based on the acceleration value.

In one embodiments, a computer-readable medium includes computer-executable instructions stored thereon that, when executed by a processor of a controller onboard the vehicle, cause the processor to perform the method.

In one embodiment, the vehicle is an autonomous vehicle. The autonomous vehicle includes at least one vehicle actuator and a controller. The controller, by a processor, is configured to receive at least one of state health and performance information associated with the at least one vehicle actuator, process the state of health and performance information to determine an acceleration value, and control the vehicle based on the acceleration value.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
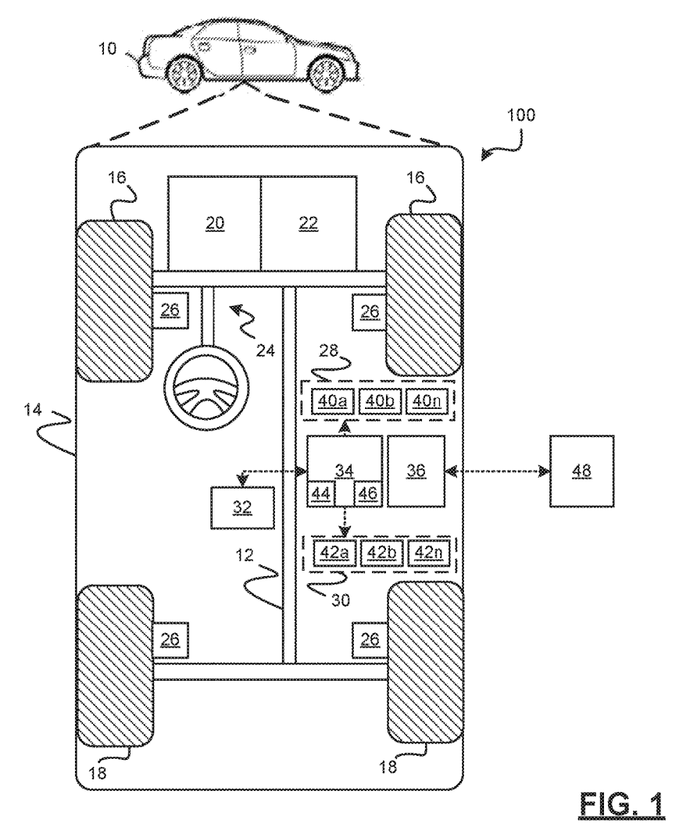
FIG. 1 is a functional block diagram illustrating an autonomous vehicle having a performance capability system, in accordance with various embodiments.

With reference to FIG. 1, a performance capability system shown generally at 100 is associated with a vehicle 10 in accordance with various embodiments. In general, the performance capability system 100 determines that the performance capability of the vehicle and controls the vehicle 10 based thereon.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the performance capability system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
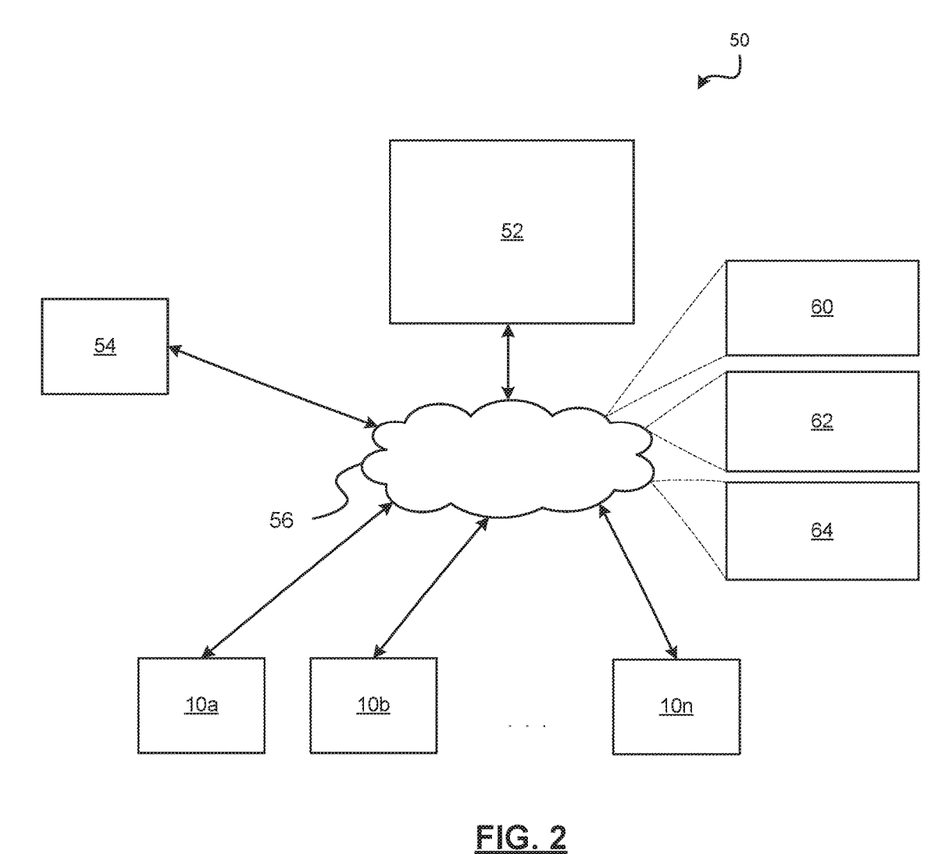
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the performance capability system 100 and, when executed by the processor 44, determine a performance capability of the vehicle 10 and control the vehicle 10 based thereon. For example, the controller 34 computes a physical capability of the vehicle 10 to accelerate, decelerate, and turn based on conditions of the vehicle actuators and the road surface the vehicle is currently driving on. The capability is dynamic and is updated continuously as information is received and/or determined. The controller 34 then controls the vehicle 10 based on the dynamically determined performance capability.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
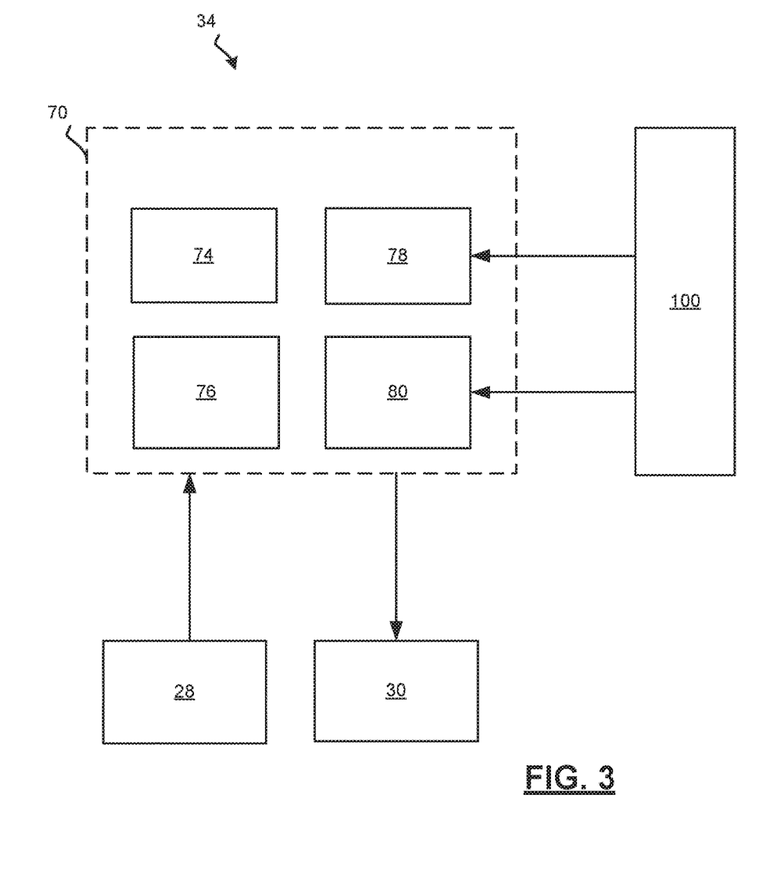
FIG. 3 is a dataflow diagram illustrating an autonomous driving system that controls the autonomous vehicle based on the determined performance capability, in accordance with various embodiments.

Referring now to FIG. 3, and with continued reference to FIG. 1, a functional block diagram illustrates various embodiments of an autonomous driving system (ADS) 70 which may be embedded within the controller 34 and which may include parts of the performance capability system 100 in accordance with various embodiments. That is, suitable software and/or hardware components of controller 34 (e.g., processor 44 and computer-readable storage device 46) are utilized to provide an autonomous driving system 70 that is used in conjunction with the autonomous vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like As mentioned briefly above, the performance capability system 100 of FIG. 1 provides determined performance capabilities to the ADS 70, and the ADS 70 controls the vehicle 10 based thereon. For example, the guidance system 78 determines a path based on the performance capability and/or the vehicle control system 80 generates controls signals based on the performance capabilities.

In various embodiments, the ADS 70 makes use of the performance capabilities based on a current driving scenario. For example, during normal driving and when potentially adverse driving conditions exist, the performance capabilities can be used to plan a path and a speed to be limited or more conservative or cautious. In another example, during emergency driving, the performance capabilities can be used to plan a path and a speed to exceed limitations such that a reaction time is faster such that the use of the vehicle's current lateral and longitudinal acceleration is optimized.

In various embodiments, as illustrated in FIG. 4, the performance capabilities are provided to the ADS 70 in the form of one or more capability diamonds. For example, a capability diamond 82 indicates an estimated acceleration capability of the vehicle 10 in a fore direction 84, an aft direction 86, a left direction 88, and a right direction 90 of the vehicle 10. The acceleration values ($a_x$, $a_y$) of the capability diamond 82 are updated dynamically based on real-time conditions. In various embodiments, a capability diamond 82a indicates minimum capabilities, while a capability diamond 82 indicates maximum capabilities. As can be appreciated, any number of capability diamonds 82 can be provided in various embodiments.

Figure 5:
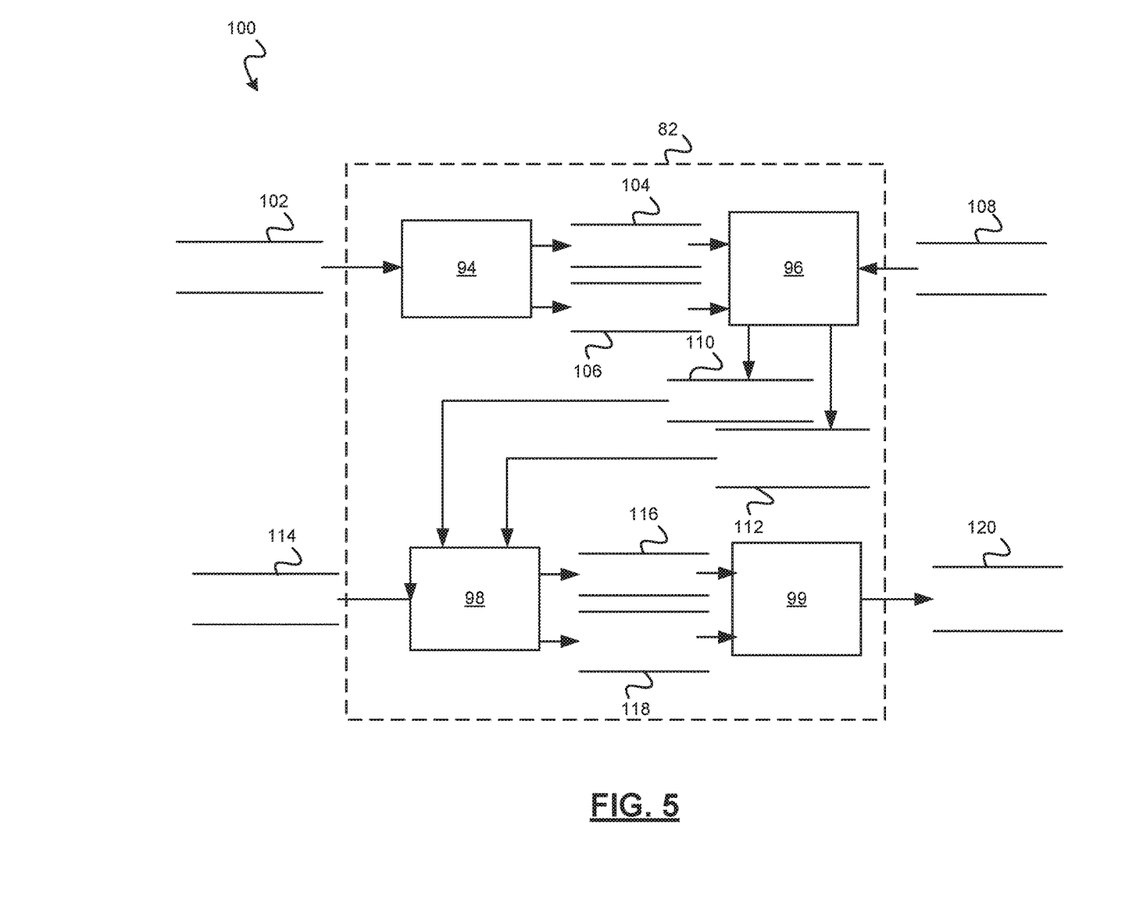
FIG. 5 is a dataflow diagram illustrating a performance capability system, in accordance with various embodiments.

With reference now to FIG. 5, the performance capability system 100 includes a performance capability determination module 92. The performance capability determination module 92 includes one or more sub-modules. As can be appreciated, the sub-modules shown can be combined and/or further partitioned in various embodiments. As shown, the performance capability determination module 92 includes an actuator value conversion module 94, a non-surface based limitation module 96, and a surface based limitation module 98, and a capability diamond construction module 99.

The actuator value conversion module 94 receives as input actuator data 102 from the vehicle motion control actuators of the actuator system 30 including, but not limited to actuators of the brake system, the steering system, and the propulsion system. In various embodiments, the actuator data 102 indicates a state of health and/or performance for the respective control actuators. For example, the actuator data 102 includes a maximum possible authority and a maximum rate of change of the authority given the current operational status for each of the control actuators.

The actuator value conversion module 94 converts the state of health and/or performance values into units that can be used by the ADS 70. For example, the actuator value conversion module 94 converts the maximum authority and the maximum rate of change for the brake system actuators to longitudinal acceleration capability values (e.g., in the fore direction, and the aft direction). In another example, the actuator value conversion module 94 converts the maximum authority and the maximum rate of change of torque produced by the propulsion system to longitudinal acceleration capability values 106 (e.g., in the fore direction, and the aft direction).

For example, the longitudinal acceleration can be determined based on the following relationships:

$$\text{Vehicle Longitudinal Acceleration} =$$
$$\frac{\text{Force Created by Actuators}}{\text{Estimated Vehicle Mass}} = \frac{\frac{\text{Actuator Torque}}{\text{Effective Tire Radius}}}{\text{Estimated Vehicle Mass}}$$

$$\text{Vehicle Longitudinal Jerk} =$$
$$\frac{\frac{\text{Force Change}}{\text{Unit Time}}}{\text{Estimated Vehicle Mass}} = \frac{\frac{\text{Actuator Torque Change}}{\text{Effective Tire Radius} * \text{Unit Time}}}{\text{Estimated Vehicle Mass}}$$

In still another example, the actuator value conversion module 94 converts the maximum authority and the maximum rate of change of steering wheel angle to lateral acceleration capability values 104 (e.g., in the left direction, and the right direction). For example, the lateral acceleration ca be determined based on the following relationships:

$$\text{Vehicle Lateral Acceleration} =$$
$$\frac{\text{Vehicle } Velocity^2}{\text{Radius of Path}} = \frac{\text{Vehicle } Velocity^2 * \text{Average Steering Angle}}{\text{Vehicle Wheelbase}}$$

$$\text{Vehicle Lateral Jerk} =$$
$$\text{Vehicle } Velocity^2 * \frac{\frac{\text{Average Steering Angle Change}}{\text{Unit Time}}}{\text{Vehicle Wheelbase}}$$

As can be appreciated, the relationships provided are based on a simple vehicle model. In various embodiments, relationships having more complexity can be used in the vehicle model. As can further be appreciated, the relationships provided describe how to convert propulsion and brake torque into longitudinal acceleration and steering angle into lateral acceleration. In various embodiments, other actuators (active aerodynamics, electronic limited slip differentials, active suspension, etc.) that impact acceleration performance and will have similar relationships.

When multiple longitudinal acceleration capability values 106 or multiple lateral acceleration capability values 104 are determined for a given direction, a final longitudinal acceleration value or a final lateral acceleration value can be determined by the actuator value conversion module 94 based on a lowest value, or other comparative method.

The non-surface based limitation module 96 receives as input the lateral acceleration values 104, the longitudinal acceleration values 106, and other vehicle data 108. The other vehicle data 108 can include, but is not limited to tire pressure data, active suspension data, aerodynamic controls data, electronic stability control data, and/or other data associated with features that limit the ability of the vehicle 10 to perform maneuvers.

The non-surface based limitation module 96 applies limits to the lateral acceleration values 104, and the longitudinal acceleration values 106. For example, the non-surface based limitation module 96 determines a longitudinal acceleration limit based on a value of the vehicle data 108 such as a tire pressure value. The longitudinal acceleration limit is compared to the longitudinal acceleration values 106; and if the longitudinal acceleration values 106 exceed the limit, limited longitudinal acceleration values 112 are set to the longitudinal acceleration limit. If, however, the longitudinal acceleration values 106 are less than or equal to the limit, the limited longitudinal acceleration values 112 are set to the longitudinal acceleration values 106.

Similarly, the non-surface based limitation module 96 determines a lateral acceleration limit based on a value of the vehicle data 108 such as low or no tire pressure. The lateral acceleration limit is compared to the lateral acceleration values 104; and if the lateral acceleration values 104 exceed the limit, limited lateral acceleration values 110 are set to the lateral acceleration limit. If, however, the lateral acceleration values 104 are less than or equal to the limit, the limited lateral acceleration values 110 are set to the lateral acceleration values 104.

The surface based limitation module 98 receives as input surface mu information 114, the limited longitudinal acceleration values 112, and the limited lateral acceleration values 110. In various embodiments, the surface mu information 114 includes an estimated surface mu. The estimated surface mu includes estimations of rain and outside air temperature from sources such as data from the cloud (e.g., road weather information system, weather reports, friction estimates from other vehicles, etc.), vision and lidar. The estimated surface mu also includes physical measurements from vehicle instability events and active tests (e.g., using the brake or powertrain to apply torque under certain conditions to check for wheel slip).

In various other embodiments, the surface mu information 114 includes a minimum surface mu and a maximum surface mu. The minimum surface mu can be estimated using sensors that are predictive in nature and provide estimates with varying levels of confidence (e.g. weather reports, cameras, air temperature etc.) For example, rain and air temperature can be fed into a lookup table to estimate road surface mu based on the observed conditions. Additionally or alternatively, vision or lidar systems can be used to search for certain patterns that describe water, snow, or ice. The maximum surface mu can be estimated using more direct measurements of vehicle/wheel dynamics, and generally assumes high surface mu until there is an instability in the vehicle/wheels that indicates the surface limit has been exceeded. Generally, the surface can be measured when there is vehicle or wheel instability. These events are signaled by anti-lock brake system, traction system, or ESC activating. For example, when a control system is active, the surface friction can be estimated by observing the lateral and longitudinal acceleration.

The surface based limitation module 98 applies the surface mu information 114 to the limited longitudinal acceleration values 112 and the limited lateral acceleration values 110 to determine final lateral acceleration values 116 and final longitudinal acceleration values 118 respectively. For example, when the surface mu information includes only the surface mu estimate, the surface mu estimate aligns roughly with vehicle acceleration. For example, a surface mu of 0.2 implies that a vehicle is roughly capable of a lateral or longitudinal acceleration of 0.2. If the surface is high mu (dry asphalt, concrete), the mu is 1.0 and the surface can support an acceleration up to 1.0. In this manner, the surface based limitation module 98 takes the minimum limited lateral/longitudinal accelerations and the surface estimate. If the surface mu is 0.3 and the longitudinal/lateral acceleration limits from the actuators are 0.5/1.0, respectively, then the final long/lateral accelerations are 0.3.

In another example, when the surface mu information includes the minimum surface mu and the maximum surface mu, two sets of final lateral acceleration values 116 and final longitudinal acceleration values 118, one minimum set that applies the minimum surface mu and set that applies the maximum surface mu.

Figure 4A:
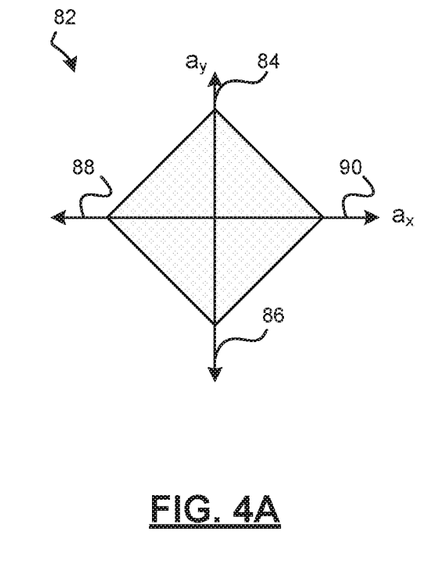
FIGS. 4A and 4B are illustrations of capability diamonds that are determined in accordance with various embodiments.
Figure 4B:
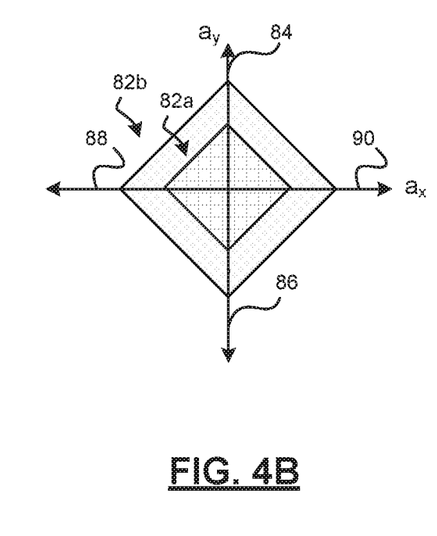

The capability diamond construction module 99 receives the final lateral acceleration values 116 and the final longitudinal acceleration values 118 and constructs the capability diamond 82 or diamonds as discussed with regard to FIG. 4A or 4B.

In various embodiments, when the surface based limitation module provides two sets of final lateral acceleration values 116 and final longitudinal acceleration values 118, two capability diamonds 82 are constructed. For example, the surface based limitations application module constructs a proactive capability diamond and a reactive capability diamond. The proactive capability diamond is determined based on the final minimum longitudinal and lateral acceleration values that are based on the minimum surface mu input; and the reactive diamond is determined based on the final maximum longitudinal and lateral acceleration values that are based on the maximum surface mu input.

Figure 6:
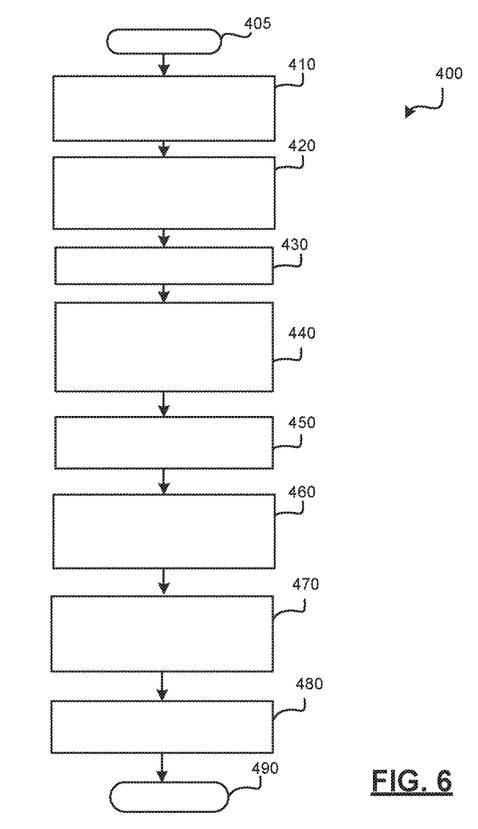
FIG. 6 is a flowchart illustrating a control method for controlling the autonomous vehicle according, in accordance with various embodiments.

Referring now to FIG. 6, and with continued reference to FIGS. 1-5, a flowchart illustrates a control method 400 that can be performed by the performance capability system 100 and/or the ADS 70 in accordance with the present disclosure. As can be appreciated in light of the disclosure, the order of operation within the method is not limited to the sequential execution as illustrated in FIG. 6 but may be performed in one or more varying orders as applicable and in accordance with the present disclosure. In various embodiments, the method 400 can be scheduled to run based on one or more predetermined events, and/or can run continuously during operation of the autonomous vehicle 10.

In various embodiments, the method may begin at 405. The state of health and performance data is received for each or one or more of the vehicle actuators at 410. The state of health and performance data is converted into lateral and/or longitudinal performance capability values at 420. Other vehicle data is received at 430. Limits are applied to the lateral and/or longitudinal performance capability values at 440. The surface mu is estimated at 450. The limited lateral and longitudinal performance capability values are further limited by the estimated surface mu at 460.

Thereafter, the capability diamond(s) is constructed based on the limited lateral and longitudinal performance capabilities values at 470. The capability diamond is evaluated when determining a path of the vehicle and/or controlling the vehicle at 480. Thereafter, the method may end at 490.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, comprising:
   receiving, by a processor, performance information associated with at least one vehicle actuator of at least one of a brake system, a steering system, and a propulsion system, wherein the performance information includes a maximum possible authority and a maximum rate of change of the authority given a current operational status of the at least one vehicle actuator;
   converting, by the processor, the performance information to an acceleration capability value based on a vehicle model;
   limiting, by the processor, the acceleration capability value based on at least one of a surface mu value, tire pressure data, active suspension data, aerodynamic controls data, and electronic stability control data;
   constructing, by the processor, a capability diamond based on the acceleration capability value; and
   controlling, by the processor, the vehicle based on the capability diamond.

2. That method of claim 1, wherein the limiting the acceleration capability value is based on the tire pressure data.

3. The method of claim 1, wherein the limiting the acceleration capability value is based on the active suspension data, the aerodynamic controls data, and the electronic stability control data.

4. The method of claim 1, further comprising:
   estimating the surface mu value; and
   wherein the limiting the acceleration capability value is based on the estimated surface mu value.

5. The method of claim 4, wherein the estimating the surface mu value comprises estimating a minimum surface mu value based on predictive sensors.

6. The method of claim 4, wherein the estimating the surface mu value comprises estimating a maximum surface mu value based on direct measurement sensors.

7. The method of claim 1, wherein the capability diamond comprises at least two lateral acceleration values and at least two longitudinal acceleration values, and wherein the controlling the vehicle is based on the at least two lateral acceleration values and the at least two longitudinal acceleration values.

8. The method of claim 7, wherein a first lateral acceleration value of the at least two lateral acceleration values is associated with a left direction of the vehicle, and wherein a second lateral acceleration value of the at least two lateral acceleration values is associated with a right direction of the vehicle, wherein a first longitudinal acceleration value of the at least two longitudinal acceleration values is associated with a fore direction of the vehicle, and wherein a second longitudinal acceleration value of the at least two longitudinal acceleration values is associated with an aft direction of the vehicle.

9. A non-transitory computer-readable medium having computer-executable instructions stored thereon that, when executed by a processor, perform a method, the comprising:
   receiving, by the processor, performance information associated with at least one vehicle actuator of at least one of a brake system, a steering system, and a propulsion system, wherein the performance information includes a maximum possible authority and a maximum rate of change of the authority given a current operational status of the at least one vehicle actuator;
   converting, by the processor, the performance information to an acceleration capability value based on a vehicle model;

limiting, by the processor, the acceleration capability value based on at least one of a surface mu value, tire pressure data, active suspension data, aerodynamic controls data, and electronic stability control data;

constructing, by the processor, a capability diamond based on the acceleration capability value; and controlling, by the processor, the vehicle based on the capability diamond.

10. An autonomous vehicle, comprising:

at least one vehicle actuator; and a controller that is configured to, by a processor, receive performance information associated with the at least one vehicle actuator of at least one of a brake system, a steering system, and a propulsion system, wherein the performance information includes a maximum possible authority and a maximum rate of change of the authority given a current operational status of the at least one vehicle actuator, wherein the controller is further configured to, by the processor, convert the performance information to an acceleration capability value based on a vehicle model, limit the acceleration capability value based on at least one of a surface mu value, tire pressure data, active suspension data, aerodynamic controls data, and electronic stability control data, construct a capability diamond based on the acceleration capability value, and control the vehicle based on the capability diamond.

11. The autonomous vehicle of claim 10, wherein the controller is further configured to, by the processor, limit the acceleration capability value based on the tire pressure data.

12. The autonomous vehicle of claim 11, wherein the controller is further configured to, by the processor, limit the acceleration capability value based on the active suspension data, the aerodynamic controls data, and the electronic stability control data.

13. The autonomous vehicle of claim 10, wherein the controller is further configured to, by the processor, estimate a surface mu value, and wherein the limiting the acceleration capability value is based on the estimated surface mu value.

14. The autonomous vehicle of claim 13, wherein the controller estimates the surface mu value by estimating a minimum surface mu value based on predictive sensors.

15. The autonomous vehicle of claim 13, wherein the controller estimates the surface mu value by estimating a maximum surface mu value based on direct measurement sensors.

16. The autonomous vehicle of claim 10, wherein the capability diamond comprises at least two lateral acceleration values and at least two longitudinal acceleration values, and wherein the controller controls the vehicle based on the at least two lateral acceleration values and the at least two longitudinal acceleration values.

17. The autonomous vehicle of claim 16, wherein a first lateral acceleration value of the at least two lateral acceleration values is associated with a left direction of the vehicle, and wherein a second lateral acceleration value of the at least two lateral acceleration values is associated with a right direction of the vehicle, wherein a first longitudinal acceleration value of the at least two longitudinal acceleration values is associated with a fore direction of the vehicle, and wherein a second longitudinal acceleration value of the at least two longitudinal acceleration values is associated with an aft direction of the vehicle.

* * * * *